(12) United States Patent
Childress et al.

(10) Patent No.: US 7,468,650 B2
(45) Date of Patent: Dec. 23, 2008

(54) METHODS AND SYSTEMS TO IMPROVE RFID INVENTORY POLLING ACCURACY

(75) Inventors: Rhonda L. Childress, Austin, TX (US); Bradley Childs, Austin, TX (US); Joann Huffman, Austin, TX (US); Stewart J. Hyman, Richmond Hill (CA); David B. Kumhyr, Austin, TX (US); Stephen J. Watt, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 236 days.

(21) Appl. No.: 11/428,006

(22) Filed: Jun. 30, 2006

(65) Prior Publication Data

US 2008/0001748 A1  Jan. 3, 2008

(51) Int. Cl.
   *G05B 19/00* (2006.01)
(52) U.S. Cl. ..................... 340/5.92; 705/28
(58) Field of Classification Search ............. 340/5.92, 340/10.1, 572.4; 705/28; 235/385
   See application file for complete search history.

(56) References Cited

U.S. PATENT DOCUMENTS

| | | | |
|---|---|---|---|
| 6,661,339 B2 | 12/2003 | Muirhead | |
| 6,765,476 B2 | 7/2004 | Steele et al. | |
| 6,943,678 B2 | 9/2005 | Muirhead | |
| 6,956,472 B1 | 10/2005 | Walcott, Jr. et al. | |
| 2002/0030597 A1 | 3/2002 | Muirhead | |
| 2005/0035849 A1* | 2/2005 | Yizhack | 340/5.92 |
| 2005/0093679 A1 | 5/2005 | Zai et al. | |
| 2005/0134433 A1 | 6/2005 | Sweeney | |
| 2005/0231365 A1 | 10/2005 | Tester et al. | |
| 2005/0237184 A1 | 10/2005 | Muirhead | |
| 2005/0241548 A1 | 11/2005 | Muirhead | |
| 2005/0258955 A1 | 11/2005 | Gloekler | |
| 2006/0054693 A1 | 3/2006 | Kawai | |
| 2006/0212165 A1 | 9/2006 | Watanabe | |
| 2006/0243174 A1 | 11/2006 | Muirhead | |
| 2007/0137531 A1 | 6/2007 | Muirhead | |
| 2007/0156491 A1 | 7/2007 | Schuler et al. | |
| 2007/0171080 A1 | 7/2007 | Muirhead | |
| 2007/0176755 A1 | 8/2007 | Fischer et al. | |
| 2007/0215700 A1* | 9/2007 | Reznik et al. | 235/385 |
| 2007/0295822 A1 | 12/2007 | Kawai | |

* cited by examiner

*Primary Examiner*—Thomas J Mullen, Jr.
(74) *Attorney, Agent, or Firm*—David A. Mims, Jr.; Schubert Osterrieder & Nickelson PLLC

(57) ABSTRACT

A method to improve polling accuracy in RFID systems is disclosed. Embodiments comprise receiving information from one or more tags by a tag reader, comparing the information from the tags to other information, and adding the tag to an inventory if the tag does not exist in the other information. While some embodiments compare the tag information from the tags to baseline inventories for other areas, some embodiments compare it to current inventories for the other areas or compare it to a combination of both inventories. Some embodiments involve polling RFID tags in storage containers.

1 Claim, 5 Drawing Sheets

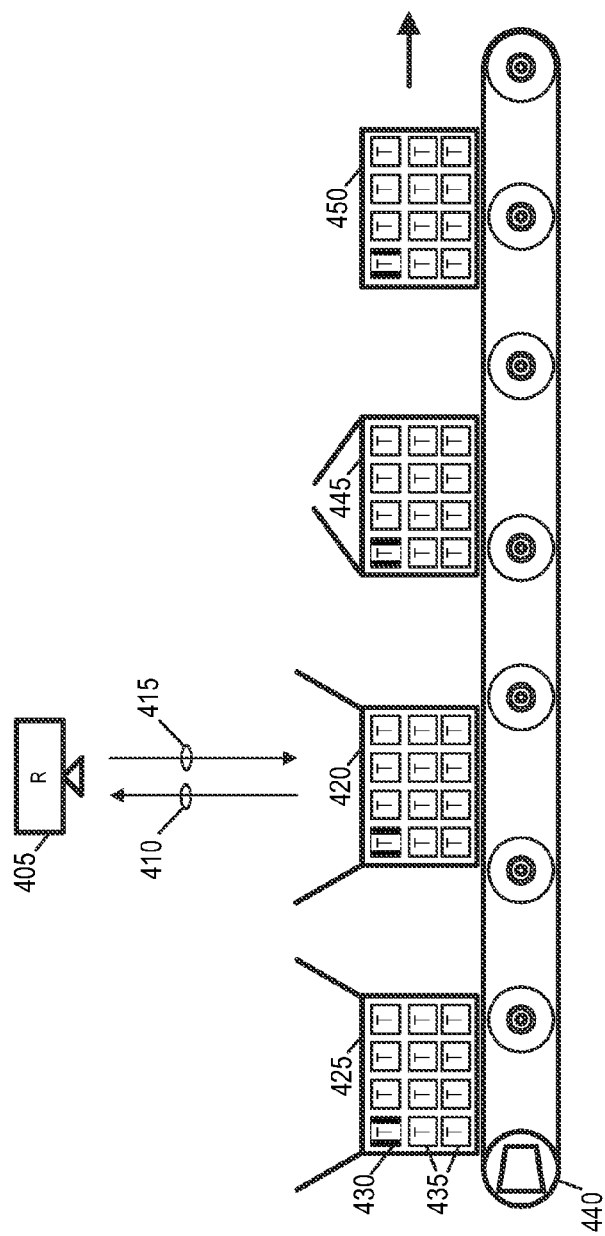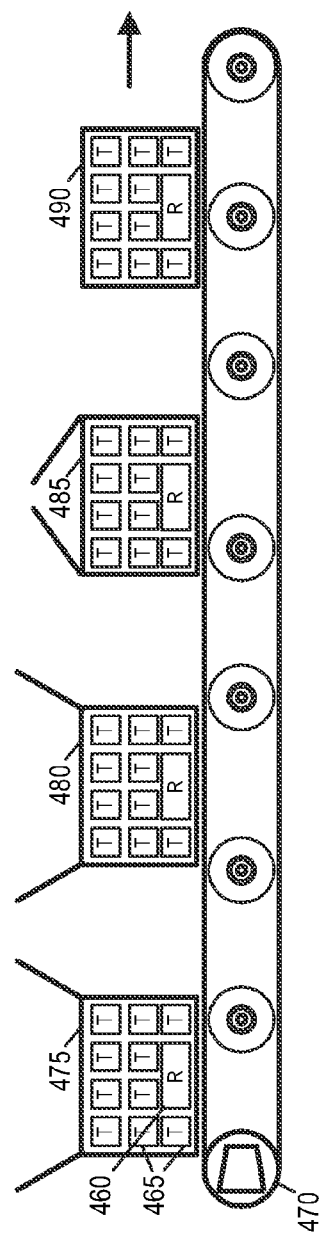
FIG 4A
FIG 4B

METHODS AND SYSTEMS TO IMPROVE RFID INVENTORY POLLING ACCURACY

FIELD

The present invention relates to radio frequency identification systems. More particularly, the present invention relates to methods, systems, and media for improving inventory polling accuracy of radio frequency identification systems.

BACKGROUND

Radio Frequency Identification (RFID) systems are becoming more and more popular for monitoring and tracking objects, animals, and sometimes even people. For example, RFID systems are used in stores for monitoring and tracking items for sale, in libraries for tracking books, in warehouses for tracking goods, on farms for monitoring cattle or livestock herds, and in roadway tolling systems for tracking passing vehicles. As the costs of manufacturing RFID components continue to decrease and the technology associated with RFID components improves, people are finding more and more applications in which to employ RFID technologies. Additionally, people are continually improving the technology and finding ways to circumvent performance limitations associated with RFID systems.

RFID systems typically consist of radio frequency (RF) tags, RF tag readers, and some type of computer running software to process information obtained from tag reads, or interrogations. The tags typically respond to an RF query, or interrogation, signal broadcast initiated by the tag reader. The tags usually send out preconfigured information, such as serial numbers or other data stored within differing types of memory devices coupled to the tags. RFID tags and tag readers usually operate without any line-of-sight requirements. The tags and readers can usually also receive and transmit signals through nonconductive materials.

Even though RFID systems have many benefits, the systems also have numerous inherent problems. First, tag readers generally have difficulties focusing RF transmissions to limited or confined areas where the tags are located. In other words, the interrogation signals are generally disbursed, or transmitted, beyond the desired sample areas. Consequently, tags located outside of the desired sample areas may detect the interrogations signals from the readers and respond by sending back their particular information. Implicit in this problem is the fact that tags, similar to readers, cannot generally focus or limit their broadcasts to a particular reader. Accordingly, as RFID systems grow in complexity, involving large numbers of tags and readers, this problem of crosstalk can introduce problems that need to be addressed.

Another problem encountered in using RFID systems is that of false reads. False reads generally arise due to the low-cost and low-power constraints of RFID tags. False reads can be further divided into two different types, false negative reads and false positive reads. False negative reads usually refer to situations where RFID tags are present in the sample area but which are not read during an interrogation, leading to the mistaken belief that objects associated with the tags are not present. Similarly, as alluded to above, false positive reads describe situations where RFID tags might be read even though they are located outside desired sample areas. This fools RFID readers to mistakenly conclude that objects attached to tags are present in the sample area, when in fact they are not.

For example, one application employing an RFID system may be a manufacturing facility having an assembly line for the manufactured products, wherein RFID tags are used to monitor and track the products on the assembly line. On assembly lines, containers are often placed next to each other. The close proximities of tags on the lines can cause readers for particular containers to pick up false positives from tags within neighboring containers when, for example, the readers attempt to take inventories of the particular containers.

Solutions to date have many drawbacks. One solution provides a "smart" container having dedicated tag readers on individual steel containers. This approach may help reduce the existence of sensing false positives, as the steel containers help focus the signal transmissions for the individual readers. However, this approach does not attempt to discern whether any of the tag reads are genuine or false. Another solution utilizes two readers, an entry reader and an exit reader, for individual containers on an assembly line. While this method may help reduce false positive reads, it unfortunately does not provide for any container inventory tracking or container integrity monitoring. In other words, this solution does nothing to address items being added to or removed from the containers between the time of the entry reader scan and the exit reader scan. What are needed, therefore, are methods and systems to detect the presence of new tags and associated objects for individual containers, or sample areas, to help determine if they are genuine or false tag reads, and to monitor or track container inventories.

SUMMARY

One embodiment comprises a method to improve polling accuracy by using RFID tag readers to read information from an RFID tag, compare the information from the tag to a quantity of stored information, and adding the tag, or item attached to the tag, to an inventory of an area if the quantity of stored information does not indicate that the tag or item should be located in a different area. The method generally involves receiving information from RFID tags attached to the goods in a local area, receiving information from a new RFID tag, analyzing the information with information of inventory databases for other remote areas, and adding information associated with the new RFID tag to the current inventory for the local area if the information is not already contained in databases for the remote areas.

Another embodiment comprises an RFID system having improved polling accuracy. The system may comprise one or more RFID receivers that receive signals transmitted from one or more RFID tags, wherein the tags are located in various storage areas. The signals contain data stored in RFID tags that may be attached to goods or storage containers. A computing module of the system compares the data transmitted from the tags with stored data, such as current inventories for the various storage areas. The system then uses the data to update individual current inventories for individual storage areas if the data does not already exist in other storage area inventories.

A further embodiment comprises a machine-accessible medium containing instructions for a machine to improve RFID system polling accuracy. The machine-accessible medium may comprise instructions for receiving information from an RFID tag reader, analyzing the information in conjunction with inventory information for a first area, and storing location information for the tag in an inventory for a second area based on the analyzed information.

BRIEF DESCRIPTION OF THE DRAWINGS

Advantages of the invention will become apparent upon reading the following detailed description and upon reference to the accompanying drawings in which, like references may indicate similar elements:

FIGS. 4A-4B illustrate two different scenarios for using RFID tags and tag readers for monitoring and tracking items in containers on conveyors.

DETAILED DESCRIPTION OF EMBODIMENTS

Figure 1:
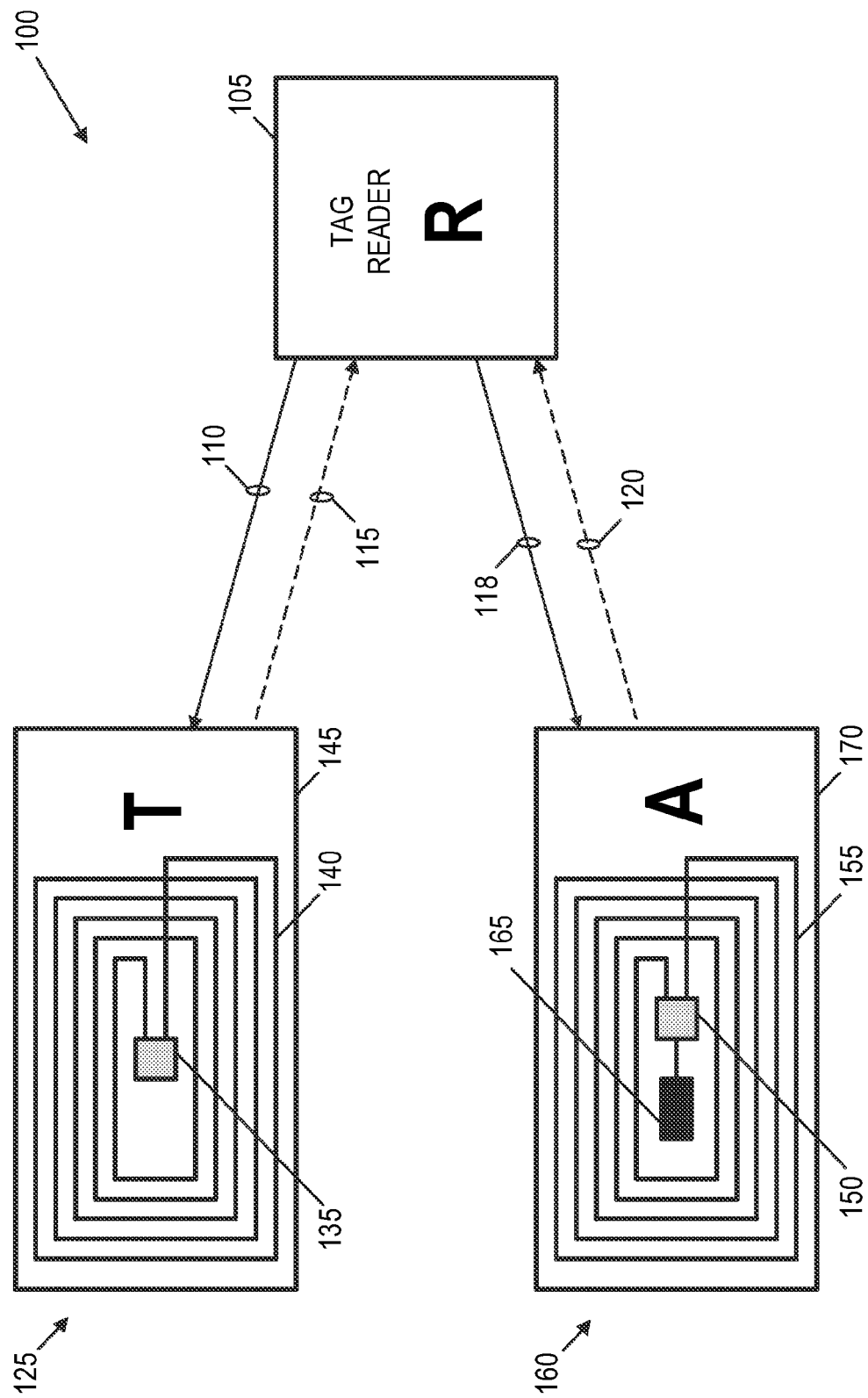
FIG. 1 depicts three RFID apparatuses, including an RFID tag reader, a passive RFID tag, and an active RFID tag.

The following is a detailed description of embodiments of the invention depicted in the accompanying drawings. The embodiments are in such detail as to clearly communicate the invention. However, the amount of detail offered is not intended to limit the anticipated variations of embodiments, but, on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, methods, systems, and media to improve radio frequency identification (RFID) inventory polling accuracy are disclosed. Methods of reading information from RFID tags, creating current inventories, comparing the inventories with baseline inventories to reduce false reads are discussed.

In some embodiments, RFID computer systems with software and hardware may utilize RFID tag information for tags attached to palletized goods. In other embodiments, RFID systems may utilize RFID tag information of tags attached to goods in storage bins, storage containers, or other packaging containers such as cardboard boxes. In even further embodiments, RFID systems may utilize RFID tag information for tags attached to goods and boxes when the boxes are on motorized conveyors.

In various embodiments, RFID systems may query one or more databases of historical information in determining the proper location for the goods and/or tags. The databases may contain information such as current inventories, baseline inventories, and shipping container manifests. In these embodiments, the RFID system may poll a specific area, and add newly detected tags and items to a current inventory for the specific area if information transmitted from the newly detected tags does not indicate that the tags or items already belong to another inventory. In some embodiments, the baseline inventories, or baseline databases, may be static and updated only manually. In other embodiments, the baseline inventories may be dynamically updated on a periodic basis based upon tag information transmitted for tags in the storage areas.

While portions of the following detailed discussion describe many embodiments employing RFID methods, systems, and media for improving RFID inventory polling accuracy, upon review of the teachings herein, a person of ordinary skill in the art will recognize that the following invention may be practiced in a variety of ways, such as by a complete hardware system or by using software in various system computers. Further, while embodiments discuss using passive tags affixed to goods and other objects stored containers and areas, one of ordinary skill in the art will recognize that objects affixed with active tags may also be used with these methods, systems, and media in similar embodiments to perform substantially equivalent functions.

Before discussing the various embodiments employing RFID system components one may need to understand, generally, how the different RFID components for various embodiments may interact with each other. After discussing generally how the various components may interact, specific example embodiments may then be discussed. RFID components in the various embodiments may use wireless radio waves to identify objects. In one of its most elemental forms an RFID system may comprise two components, an RFID tag and an RFID reader.

RFID tags for various embodiments, which may be referred to as RFID cards or RFID transponders, may exist in many shapes and sizes. Generally, they may contain one or more coils to serve as an antenna, and a radio transceiver contained on a silicon microchip. This microchip may also store information, such as a unique identification number for identifying the object to which the tag is attached. Some RFID tags may allow a reader to update or change the information stored in the tag.

RFID tags in various embodiments may be classified as passive or active. Passive tags may generally not broadcast any information stored within the tag until activated by an RFID reader. Active tags, on the other hand, may constantly broadcast identification or information stored on the microchip. These active tags may contain batteries. The batteries may provide additional power for transmitting from the transceiver and operating the microchip. The batteries may allow the tags to send their data greater distances than passive tags.

RFID readers may have the same basic components as RFID tags, including an antenna and reader electronics. The reader generally performs several functions. In some systems, a reader may produce a low-level radio frequency (RF) field generated by the reader antennas. This field may broadcast activation codes, which may trigger RFID tags in the vicinity of the reader and cause them to spring into action. This magnetic field may also provide the actual operating power for passive RFID tags. When a passive RFID tag is carried within range of the magnetic field generated by the reader, the antenna in the tag may collect the field energy from the magnetic field and use it to power the tag microchip. Passive tags may then use this captured field energy to transmit information stored on the microchip, such as the identification information. The reader receives the information transmitted from the tag, whereupon the reader may store it or transmit it to another device, such as a central computer, for processing. One example would be capturing the serial number of a product placed in a warehouse container by a warehouse worker, using the transmitted data to determine if the inventory list associated with the container should be updated to include the product, and adding it to the container inventory.

With this general understanding of the fundamental items of RFID systems, we now discuss in more detail how the RFID components may operate in the various embodiments. FIG. 1 depicts an RFID apparatus 100 which may be employed in various embodiments for improving polling accuracy. RFID apparatus 100 comprises an RFID tag reader 105 which may be used to communicate with a passive RFID tag 125. In alternative embodiments, RFID tag reader 105 may be used to communicate with an active RFID tag 160. Passive and active tags similar to these may be attached to objects in containers in some embodiments.

When communicating with the passive RFID tag 125, RFID tag reader 105 may transmit a tag reader transmission signal 110 to activate the passive RFID tag 125. Upon receiving the tag reader transmission signal 110 via a passive tag antenna 140, the passive tag antenna 140 may transfer the tag reader transmission signal 110 to a passive tag integrated circuit 135. The passive tag integrated circuit 135 may utilize the tag reader transmission signal 110 for operational power and in turn transmit information back to RFID tag reader 105 via a passive tag transmission signal 115.

The passive RFID tag 125, comprised of the passive tag antenna 140 and the passive tag integrated circuit 135, may be attached to a passive tag surface 145. In many embodiments, the passive tag surface 145 may be a paper label attached to an object. In other embodiments, the passive tag surface 145 may be cloth label attached to a consumer good, such as a shirt or pair of jeans. In alternative embodiments, the passive tag surface 145 may be a label attached to a cardboard box containing a mechanical item, such as an aircraft engine part for example.

As stated RFID apparatus 100 may comprise RFID tag reader 105, used to communicate with active RFID tag 160. RFID tag reader 105 may receive information from active RFID tag 160 via an active tag transmission signal 120. Active tag transmission signal 120 may transmit information, such as an item description or serial number, stored in an active tag integrated circuit 150 and transmitted via an active tag antenna 155. Active RFID tag 160 may also contain a battery 165. The battery 165 may provide power to the active tag integrated circuit 150, as well as increase the signal strength of active tag transmission signal 120. Increasing the signal strength of active tag transmission signal 120 may allow RFID tag reader 105 to receive active tag transmission signal 120 at greater separation distances than the passive tag transmission signal 115, generated by the passive RFID tag 125.

Similar to the passive tag surface 145, active RFID tag 160 may reside on an active tag surface 170. In different embodiments, the active tag surface 170 may be a paper, plastic, or cloth label attached to a consumer good. In some embodiments active RFID tag 160 may also receive information from RFID tag reader 105, via a tag reader transmission signal 118, store the information in active tag integrated circuit 150, and even have the information stored in active tag integrated circuit 150 modified by tag reader 105, or other similar tag readers.

Different embodiments will contain varying numbers of RFID tag reader 105. For example some embodiments may contain only one or two of RFID tag reader 105. Other embodiments, however, may employ a hundred or more of RFID tag reader 105 arranged in rows and columns and attached to an equal number of storage bins. An RFID tag reader system in a warehouse or manufacturing facility may comprise a variety of arrangements of RFID readers. One RFID tag reader arrangement may comprise a row of individual RFID tag readers located adjacent to corresponding storage bins containing items with RFID tags. Alternatively, another RFID tag reader arrangement may comprise individual RFID tag readers located in the bottom of containers, such that readers are mobile and can be moved with the containers. Regardless of the tag reader arrangement, the tag readers may monitor RFID tags on objects in containers and be used to track changes in container inventories and container integrities.

In some embodiments, RFID tag reader 105 may only be able to communicate with passive tags, similar to the passive RFID tag 125. In other embodiments, RFID tag reader 105 may only be able to communicate with active tags, such as active RFID tag 160. However, in some embodiments, RFID tag reader 105 may be a multi-format tag reader, capable of communicating with various models or types of both passive and active tags. Other embodiments may employ any combination or mix of single format and multi-format tag readers, for communicating with both active and passive tags. In some embodiments, restrictions and isolation of RFID tags from readers may be accomplished via different signal characteristics, such as frequency, or from analysis of the stored RFID tag information.

The types of information stored in the passive tag integrated circuit 135 and the active tag integrated circuit 150 may vary greatly. For example, a tag integrated circuit may be attached to a consumer good and only contain simple information such as a serial number for the consumer good. Alternatively, though, the tag integrated circuit may contain such information as the date the consumer good was manufactured, physical dimensions and weight of the consumer good, or the type or classification of the good. In various embodiments, such information may be captured and analyzed within a database context to increase polling accuracy of the associated RFID systems.

With varying types and amounts of information being stored on various passive and active tag integrated circuits, similar to the passive tag integrated circuit 135 and the active tag integrated circuit 150, RFID tag reader 105 may read all the information from the tags, or RFID tag reader 105 may only read portions of the information. For example, some embodiments may have RFID tag reader 105 only receive product identification information, while in other embodiments RFID tag reader 105 may receive product model information along with the product identification information.

In addition to varying amounts of information being read from various tags in different embodiments, some embodiments may employ an RFID tag reader 105 capable of not only reading information but capable of writing information to RFID tags as well. For example, after activating the passive RFID tag 125 via the tag reader transmission signal 110 and receiving information via the passive tag transmission signal 115, RFID tag reader 105 may send information back to the passive RFID tag 125 using the tag reader transmission signal 110 which may be stored in memory of the passive tag integrated circuit 135.

One example of an embodiment where information is written to the passive RFID tag 125 may be when the passive RFID tag 125 is not attached to an object in a container, but actually attached to the container and used to store information for parts or objects in the container. For example, a single RFID tag reader 105 may be used to read the contents of numerous containers, instead of having individual readers for each container. The RFID tag reader 105 may interrogate the contents of a particular container, develop a current inventory of parts in that container, and write inventory information to the passive RFID tag 125. An alternative similar embodiment may not write information about the contents of the container, but rather store the information to a database, associate a unique identification number with the container, and write the identification number to the passive RFID tag 125. That way, whenever RFID tag reader 105 moves to other containers and later returns to the container having the passive RFID tag 125, RFID tag reader 105 may retrieve the identification number from the passive RFID tag 125, use it to pull up the database information about the contents the last time the container was polled, interrogate the contents again, and use the information to update the current inventory of the container.

Similar to writing information to the passive RFID tag 125, RFID tag reader 105 may also write information to active RFID tag 160. In writing information to active RFID tag 160, such embodiments may employ tag reader transmission signal 118.

Figure 2:
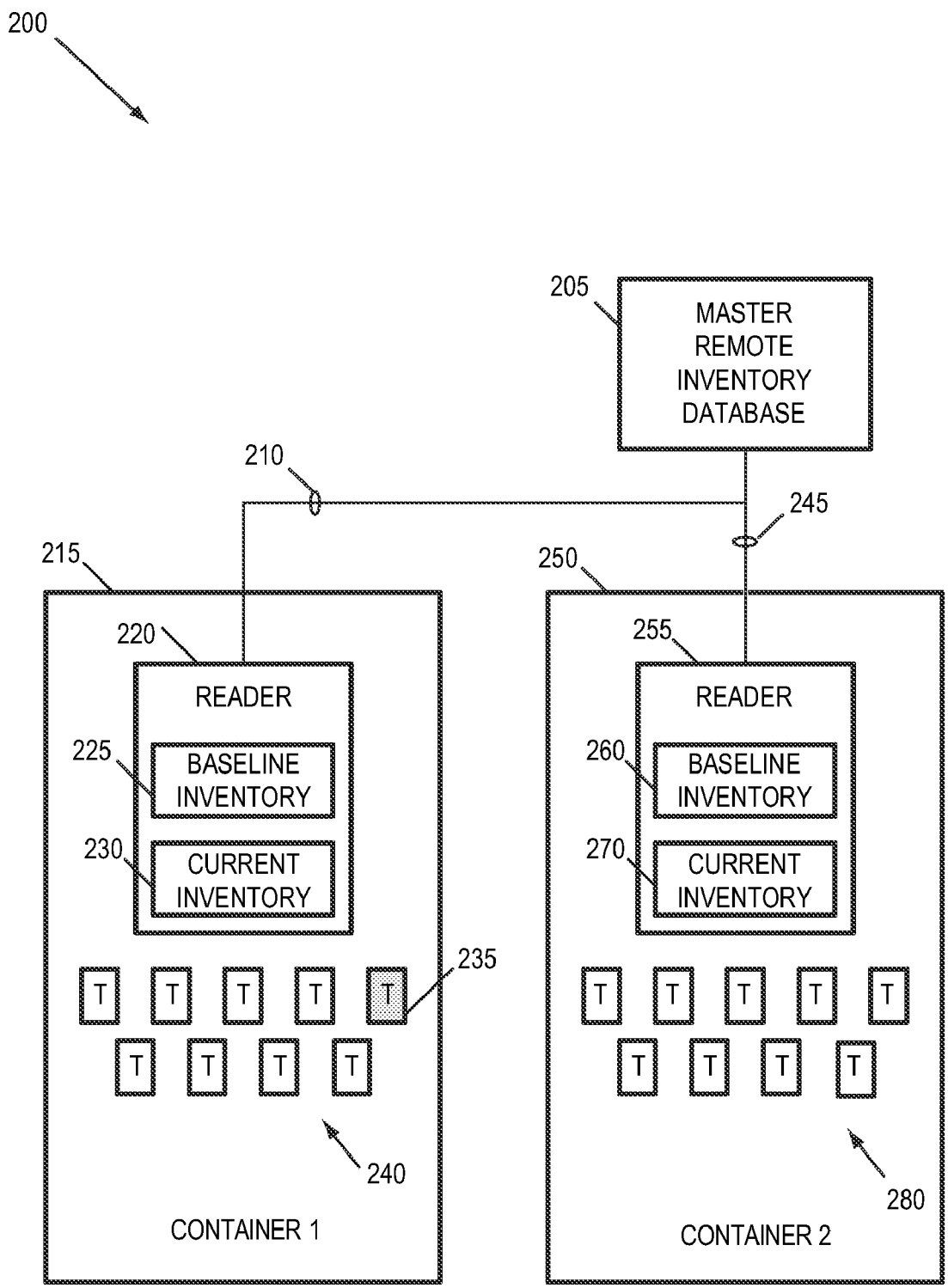
FIG. 2 depicts a system comprising two containers and two RFID tag readers for monitoring the contents of tags within the containers.

To better illustrate how various embodiments employing tags and tag readers may be used to track container or box inventories with fewer false reads, we turn now to FIG. 2. FIG. 2 shows a system 200 comprising two containers, a first container 215 and a second container 250. Such containers may comprise, for example, metal and wooden bins or cardboard boxes that store parts in a manufacturing warehouse. In an embodiment according to system 200, each container may have its own tag reader. In FIG. 2, container 215 has tag reader 220 while container 250 has tag reader 255. In different embodiments, the tag readers 220 and 255 may be situated or located in different locations. For example, in some embodiments tag readers 220 and 255 may be positioned atop perimeter edges of containers 215 and 250. In other embodiments, tag readers 220 and 255 may be located within the confines of containers 215 and 250. In other embodiments, tag readers 220 and 255 may be attached to walls or ceilings near containers 215 and 250.

Tag reader 220 may read information from one or more RFID tags 240 located within the confines of container 215. Similarly, tag reader 255 may read information from RFID tags 280 located within the confines of container 250. The information read from RFID tags 240 and 280 may be, for example, unique serial numbers and model numbers for objects to which each of the individual tags is affixed. For example, container 250 may house nine liquid crystal display (LCD) monitors, each monitor having an individual RFID tag 280 affixed to it. Each of the individual RFID tags 280 may store the serial and model numbers for each monitor.

Upon reading information from tags located in each container, each of the readers, or processors coupled to the readers, may use the information to generate a current inventory for its respective container. Continuing our previous example, upon reading the information from the nine RFID tags 280 tag reader 255 may generate a current inventory 270 for container 250 and store it in a memory device of tag reader 255. Similarly, RFID tag reader 220 may generate current inventory 230 for container 215 after reading all of the information from RFID tags 240 and store inventory 230 in a memory device of tag reader 220.

In addition to current inventories 230 and 270, tag readers 220 and 255 may also store baseline inventories 225 and 260 in their respective memory devices. These baseline inventories may comprise preprogrammed lists of inventory items that containers 215 and 250 normally hold or are expected to hold, which may or may not match the respective current inventories. For example, baseline inventory 260 may normally consist of information indicating that container 250 normally has twelve (12) LCD monitors and possibly even provide the particular count and model numbers of different LCD monitors. Similarly, memory for tag reader 220 may store baseline inventory 225. Baseline inventory 225 may consist of information, for example, indicating that container 215 normally contains ten (10) cathode ray tube (CRT) monitors, as well as the particular counts and model numbers for groups of CRT types.

During daily operation of the warehouse having containers 215 and 250, tag readers 220 and 255 may periodically interrogate, or poll, the confines of containers 215 and 250. After each poll, tag readers 220 and 255 may update current inventories 230 and 270, respectively. Additionally, tag readers 220 and 255 may store all inventories in a master remote inventory database 205. For example, database 205 may comprise a comprehensive warehouse inventory database reporting live inventory information for containers 215 and 250. Tag reader 220 may periodically transmit current inventory 230 to database 205 over communications link 210 and tag reader 255 may periodically send current inventory 270 over communications link 245.

Also during daily operations, people working in the warehouse may add items to and remove items from containers 215 and 250. For example, tag 235 may represent a newly added CRT monitor placed in container 215 as part of routine stocking operations. Tag reader 220 may poll the confines of container 215, generate a list of tags 240, and compare this new list of tags with the tags previously stored for current inventory 230. In this process, tag reader 220 may note that newly added tag 235 did not exist in the "previous" current inventory 230. That is to say, tag reader 220 may identify tag 235 as a potential new item that may need to be added to current inventory 230.

Before automatically adding tag 235 to current inventory 230, however, the processor controlling the operation of tag reader 220 may first check to see if tag 235 exists in any other inventories in the warehouse. For example, tag reader 220 may communicate with tag reader 255 over communication links 210 and 245, retrieve both the baseline inventory 260 and the current inventory 270 from tag reader 255, and analyze the contents of those inventories for information pertaining to tag 235. If tag reader 220 concludes that tag 235 is not in either baseline inventory 260 or current inventory 270, then tag reader 220 may be programmed to update current inventory 230 to include tag 235. By employing this technique or verification method, tag reader 220 may help eliminate or reduce false positives. To further illustrate how this technique may reduce these false positives, more explanation may be in order.

Assume that tag 235 was recently added to container 215 and that tag reader 120 correctly recognized it and added it to current inventory 230. However, assume that container 215 and 250 are in close proximity to each other. Due to this close proximity, tag reader 255 may poll container 250 to update current inventory of 270. However, in response to this polling, newly added tag 235 may actually respond to the polling or interrogation and transmit information contained in tag 235. As a consequence, tag reader 255 may receive this response from tag 235 and discern that it is contained within the confines of container 250 and intermixed among tags 280. However, before adding tag 235 to current inventory 270, tag reader 255 may request the contents of baseline inventory 225 and current inventory 230 from tag reader 220 via communication links 210 and 245. After retrieving these inventories from tag reader 220, the computing processor operating tag reader 255 may recognize the tag 235 is already included in current inventory 230. Accordingly, tag reader 255 may choose to ignore the transmitted response from tag 235 and not add it to current inventory 270. By employing this method of checking, tag reader 255 detected a false positive response and correctly ignored it.

As described in the example scenario just discussed, tag reader 255 detected the false positive response by examining current inventory 230. One skilled in the art will realize, however, that tag reader 255 may also utilize information contained within baseline inventory 225 and baseline inventory 260 to detect false positives. For example, assume that tag reader 220 periodically interrogates the contents of container 215 to update current inventory 230. However, assume further that tag reader 220 has not yet interrogated container 215 since tag 235 was added. Consequently, current inventory 230 will not reflect the additional tag. If tag reader 255 polls container 250, senses the presence of tag 235, and retrieves the inventories from tag reader 220, tag reader 255 may still have enough information to filter the false response.

Tag reader 255 may compare the information from tag 235 to the information contained within baseline inventory 225 and baseline inventory 260. The programming software for tag reader 255 may be programmed to recognize that the information on tag 235 pertains to a CRT monitor, which matches the type of items or model numbers that should be stored within container 215. Additionally, tag reader 255 may be programmed to recognize that the information on tag 235 does not match the type of information that should be on an object stored in container 250. More specifically, tag reader 255 may recognize that all of items in baseline inventory 260 are LCD monitors, while tag 235 is of a different type or model number, a specific type of CRT monitor. Accordingly, tag reader 255 may conclude that the signal received from tag 235 corresponds to a false positive and tag reader 255 may choose to exclude it from current inventory 270.

Alternative embodiments may have slight variations in either configuration and/or operation, but still encompass the spirit of the techniques described to increase polling accuracy. For example, in some embodiments tag readers 220 and 255 may only store their respective baseline and current inventories locally in memories of tag readers 220 and 255. In other words, some embodiments may include no master remote inventory database 205. Readers for such embodiments may thus obtain the baseline and current inventories from each other communication links 210 and 245. Conversely, other embodiments may comprise tag readers 220 and 255 which are incapable of either storing the inventories or evaluating the information extracted from container interrogations. In such embodiments, inventory database 205 may comprise a central controlling computer that reads the container information from the tag readers, stores it locally, and uses it to update the current inventories while reducing the number of false reads.

In some embodiments, tag readers 220 and 255 may continuously poll containers 215 and 250 for changes of inventories. In other embodiments the polling frequency may be reduced. For example, the tag readers may only poll the containers once every ten to twenty minutes.

Some embodiments may employ baseline inventories that are static. In other words, the inventories may be programmed manually or only once during startup of the system. No matter how the current inventories may consistently differ from the baseline inventories, the associated RFID systems may not alter them while in operation. People may only alter them manually by forcing or entering new baseline inventory configurations. For example a person may manually reconfigure baseline inventory 260 so that it contains fifteen (15) LCD monitors instead of twelve. Alternatively, some embodiments may dynamically update the baseline inventories. For example, tag reader 255 may keep rolling averages for the numbers and types of LCD monitors in container 250 for current inventory 270. If, for example, the rolling average numbers consistently differ from the baseline inventory, or differ from the baseline inventory by a great magnitude and/or for a particular amount of time, tag reader 255 may dynamically "update" baseline inventory 260.

As it will be obvious to one skilled in the art, one may employ an almost unlimited number of different algorithms and methodologies for periodically updating the baseline inventories. For example, some embodiments may establish baseline inventories 225 and 260 whenever tag readers 220 and 255 are powered up, or each time the readers are rebooted.

In some embodiments, communication links 210 and/or communication link 245 may comprise physical communication cables, such as several twisted pairs of wires in a serial cable. Other embodiments may comprise wireless communication links 210 and 245. Additionally, the communication protocols used for communication links 210 and 245 may differ as well. In some embodiments the protocols may comprise Transmission Control Protocol/Internet Protocol (TCP/IP) over Ethernet communications links. In further embodiments, the protocols or communication methods may comprise Bluetooth® communication methods. Additionally, the signaling may comprise wireless communication signaling methods employing RF, UHF, VHF, or infrared signals, as examples.

Figure 3:
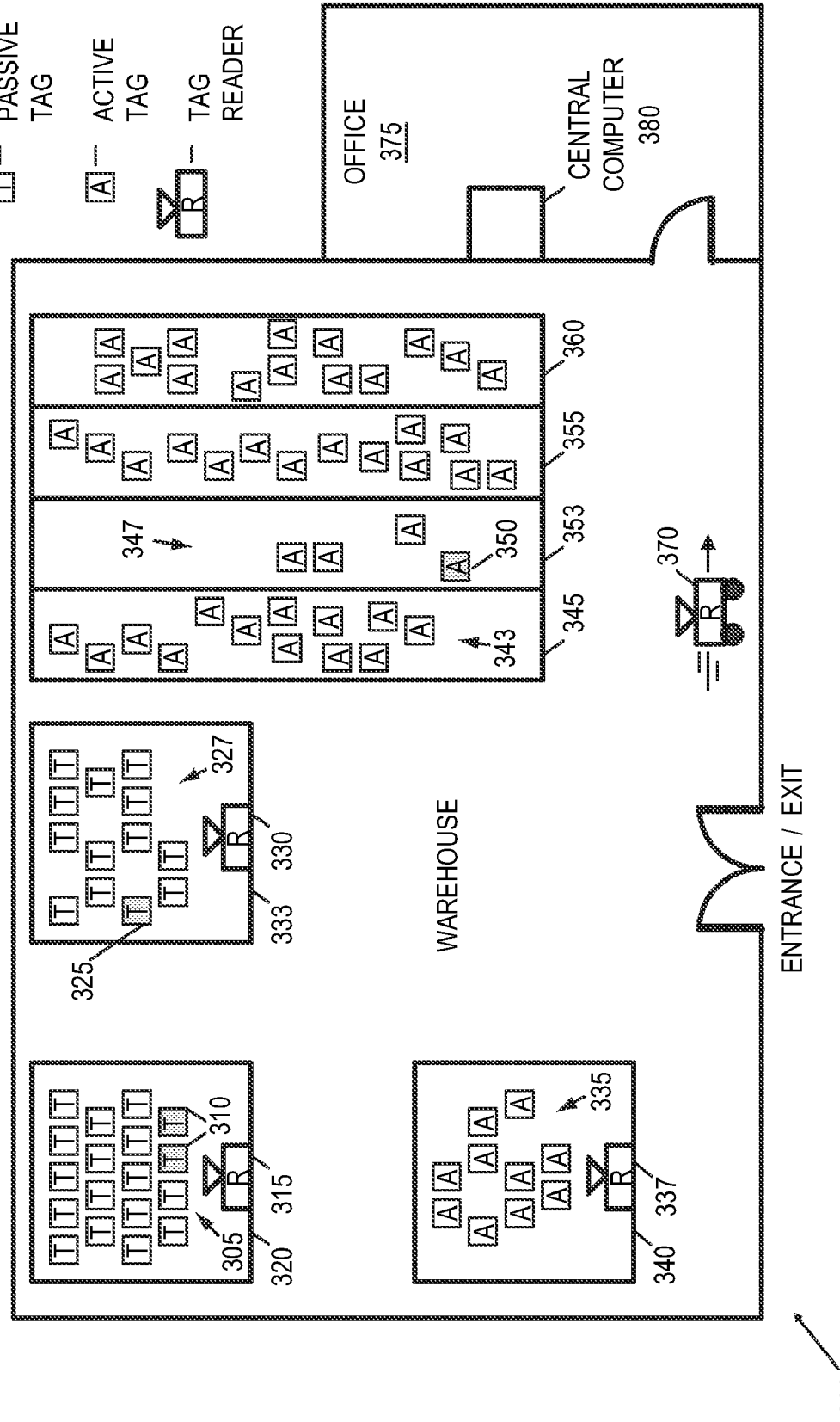
FIG. 3 shows an example warehouse employing different RFID systems for monitoring tags in containers and bins, and tracking the tags via a central computer system.

Turning now to FIG. 3, we see an example warehouse 300 employing different RFID systems for monitoring tags in containers and bins, and tracking the tags via a central computer system 380. More specifically, warehouse 300 has a first container 320 and a second container 333 confining objects with tags 305 and 327, respectively. Warehouse 300 also has a third container 340 with objects having active tags 335 affixed to them.

Containers 320, 333, and 340 may employ dedicated tag readers 315, 330, and 337, respectively, to periodically poll individual container contents and monitor individual container inventories. Again, all three containers may reside in close proximity to each other, such that false positive reads frequently cause problems.

Central computer system 380 may cause tag reader 315 to poll tags 305 in container 320. As a result, central computer system 380 may note the addition of two new tags 310 that were not in the previous inventory for container 320. Before automatically or indiscriminately adding the two new tags 310 to the inventory for container 320, central computer system 380 may first examine the contents of the most current inventories taken for containers 333 and 340. After noting that neither of the two previous inventory listings contain the two new tags 310, central computer system 380 may then add them to the current inventory for container 320.

Central computer system 380 may take an additional step before updating the current inventory for container 320. Specifically, central computer system 380 may trigger tag readers 330 and 337, causing them to poll containers 333 and 340, respectively. Doing so may allow central computer system 380 to obtain more current inventories for containers 333 and 340, ultimately reducing the potential for false positives even further. For example, suppose central computer system 380 causes tag reader 315 to poll container 320 and finds that tag reader 315 responds by transmitting back responses from tags 305, the two new tags 310, and newly added tag 325, which was added to container 333. If central computer system 380 has not caused tag reader 330 to recently update the current inventory for container 333, the inventory will not contain newly added tag 325. Consequently, if central computer system 380 uses the old inventory for container 333, it may incorrectly add tag 325 to the current inventory for container 320 instead of container 333. Additionally, since tag 325 was added to the inventory for container 320, a later scan or interrogation of container 333 may detect the presence of tag 325, but central computer system 380 will not add it to the inventory of container 333 due to it already being added to the inventory for container 320.

FIG. 3 illustrates another embodiment wherein each storage area may not have a dedicated tag reader. Storage bins 345, 353, 355, and 360 may contain groups of active tags, such as active tags 343 in storage bin 345 and active tags 347 in storage bin 353. Instead of having dedicated tag readers for each storage bin, a mobile tag reader 370 may instead move from bin to bin while scanning and inventorying storage bins 345, 353, 355, and 360. As depicted in FIG. 3, mobile tag reader 370 may move from left to right when scanning or polling individual bins. Similarly, if mobile tag reader 370 were scanning bins arranged vertically, mobile tag reader 370 may scan an individual bin from top to bottom then move to the top right position of the adjacent bin on the right side, scan the adjacent bin from top to bottom, and continue until all bins have been scanned.

In different embodiments mobile tag reader 370 may be a standalone apparatus for scanning bins, wherein mobile tag reader 370 has onboard electronics, such as a processor, memory, and some device for data storage. For example, mobile tag reader 370 may comprise a processor and memory storing inventory data on a hard drive. Alternatively, in other embodiments, mobile tag reader 370 may simply be a reader and minimal electronics necessary to communicate with a central computer, such as central computer 380 in office 375.

At a particular given time, mobile tag reader 370 may establish which bin it is scanning by a variety of different methods in different embodiments. For example, in one embodiment mobile tag reader 370 may establish which bin it is scanning by detecting a uniquely coded tag in one of the bins. The uniquely code tag may be fastened to one of the bins, such as bin 353 for example, and be encoded with unique identification such as "Bin 353". Alternatively, in other embodiments, mobile tag reader 370 may establish which bin is scanned by employing other technologies, such as proximity switches, proximity or location sensors, or servo motors, as examples.

As with the other embodiments, bins 345, 353, 355, and 360 may be in close proximity to other storage bins and containers, such as container 333. While scanning bin 343 mobile tag reader 370 may detect the presence of tag 325. Mobile tag reader 370 may communicate with central computer 380 and determine the tag 325 been added to the inventory of container 333. Accordingly, mobile tag reader 370 may not add tag 325 to the current inventory of bin 343.

While scanning the contents of bin 345, mobile tag reader 370 may also detect the presence of a newly added active tag 350 among active tags 347 in bin 353. Before adding tag 350 to the inventory, however, mobile tag reader 370 may check for the presence of tag 350 in both the current inventory and the manifest of bin 353. Since mobile tag reader 370 may have not yet scanned bin 353, the current inventory may not include tag 350. However, the manifest of bin 353 may include tag 350. As a consequence of the manifest including tag 350, mobile tag reader 370 may exclude tag 350 from the current inventory of bin 343. When mobile tag reader 370 moves to bin 353 and scans its contents, it may again detect the presence of tag 350. Since the manifest of bin 353 may include tag 350, mobile tag reader 370 may immediately add it to the current bin 353 inventory. However, the manifest of bin 353 may not include tag 350. In such case, mobile tag reader 370 may proceed by examining the current inventories and manifests of bins 345 and 355. Since the inventories and manifests may not contain tag 350, mobile tag reader 370 may then add tag 350 to the current inventory of bin 353.

FIGS. 4A and 4B illustrate different ways in which tag readers may scan containers on an assembly line or conveyor system. FIG. 4A has a motorized conveyor assembly 440 moving containers 425, 420, 445, and 450 during one phase of a packing process. For example, during this packaging phase the containers may be scanned, closed, and sealed for shipping. A stationary tag reader 405 may be positioned above conveyor assembly 440 to scan the containers as they pass underneath. Tag reader 405 may transmit a signal 415 to activate tags in the containers, for scanning. Signal 415 may also facilitate storing information in designated tags of the containers. Another signal 410 may transmit information back to tag reader 405 from activated tags in the containers.

As shown in FIG. 4A, container 425 may hold a number of objects with tags 435. Container 425 may also have a special tag 430 not affixed to any particular object in container 425, but attached to container 425 itself. For example, tag 430 may be a clip-on tag capable of being reused after the container has completed its lifecycle with any inventory information stored in it being cleared before its reuse. Tag 430 may store information related to the contents of container 425. For example, tag 430 may have been preprogrammed and contain manifest information for container 425. As container 425 moves on conveyor assembly 440 and becomes positioned under tag reader 405, tag reader 405 may activate passive tags 435 and tag 430 via signal 415. In response to the activation from signal 415, tag 430 and tags 435 may transmit their stored identification and manifest information back to tag reader 405 via numerous return signals 410. Tag reader 405 may then use the information transmitted from tag 430 and tags 435 to create a current inventory for container 425. Tag reader 405 may then transmit the current inventory back to tag 430 via signal 415, whereupon tag 430 may store the current inventory. Once container 425 arrives at its destination, another tag reader may interrogate tag 430 to retrieve its manifest and current inventory information.

Similar to other embodiments, tag reader 405 may use information stored in adjacent containers to reduce the occurrence of false positives. For example, while interrogating tags stored in container 420, tag reader 405 may detect a rogue signal transmitted from one of the tags in container 445. When it created the current inventory for container 445, tag reader 405 may have temporarily stored the manifest and current inventory information in memory of tag reader 405. Tag reader 405 may detect that the rogue tag already exists in the manifest and/or current inventory for container 445. Consequently, tag reader 405 may determine it to be a false positive and not include it in the inventory for container 420.

While creating the current inventory for container 420 tag reader 405 may also reduce the likelihood of a rogue signal transmitted from one of the tags 435 in container 425. While tag reader 405 may have not yet scanned container 425, it may nonetheless obtain manifest information stored tag 430. For example, tag reader 405 may communicate and retrieve the manifest information from a central computer containing a database of manifests for containers on conveyor assembly 440. In retrieving the manifests, tag reader 405 may determine that the rogue tag already exists in the manifest for container 425 and exclude it from the current inventory for container 420. In another example, tag reader 405 may be able to send out unique activation signals which only activate tags containing manifest information, such as tag 430. As a result, tag reader 405 may be able to retrieve the manifests for containers 445, 420, and 425. Tag reader may then determine that the rogue signal was most likely transmitted from a tag in container 425 and therefore exclude it from the current inventory for container 420.

FIG. 4B depicts another embodiment for RFID inventory tags on a conveyor assembly 470. Similar to FIG. 4A, conveyor assembly 470 may move containers 475, 480, 485, and 490 for final inventorying and shipping. However, in this particular embodiment, each container may have its own dedicated tag reader. For example, container 475 has a dedicated tag reader 460. Tag reader 460 may, under one or more preset conditions, interrogate the tags 465 of container 475. To eliminate false positives, tag reader 460 may be able to communicate, via a wireless technology, with the readers in containers 480, 485, and 490. If tag reader 460 were to detect the signal of one of the tags in any of the adjacent containers while interrogating its own contents, tag reader 406 may exclude the rogue tag from its inventory after examining the manifests and/or current inventories of the adjacent containers, such as containers 480, 485, and 490.

The aforementioned scenarios are illustrative examples of various embodiments and demonstrate the innumerable methods, systems, and apparatuses for improving inventory polling accuracy of RFID systems. However, due to the extreme flexibility of RFID systems and the great number of different possible RFID system configurations, describing all such variations in which the polling accuracy of RFID systems may be improved is impossible. Accordingly, one should keep in mind that these examples are merely illustrative and that embodiments which are similar to these described examples may well come within scope and spirit of the invention.

Figure 5:
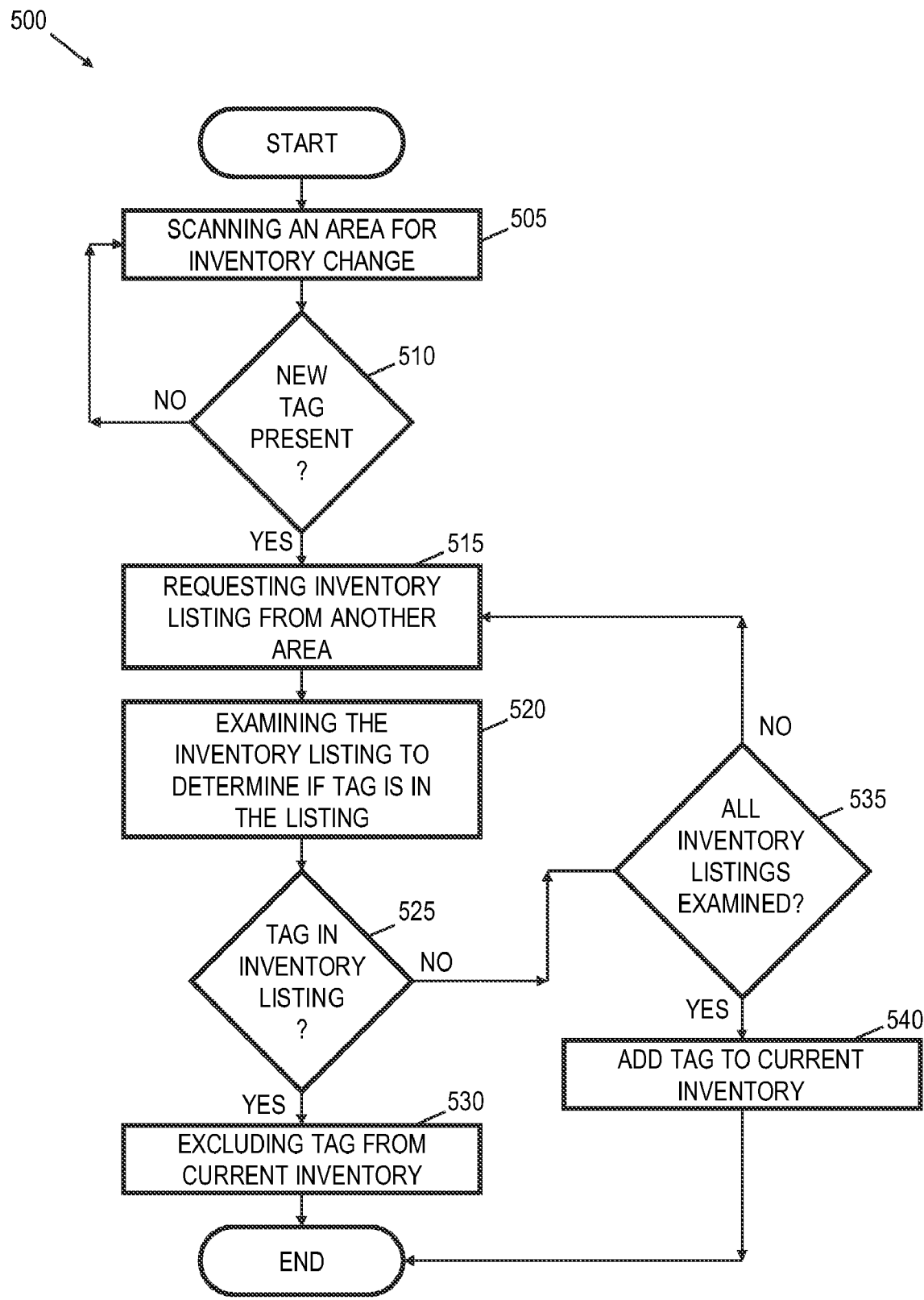
FIG. 5 illustrates a flowchart of a method for increasing the polling accuracy of tags for inventory of an area.

FIG. 5 depicts a flowchart 500 for a method of improving the polling accuracy of an RFID system. Flowchart 500 begins with scanning an area for a change in inventory (element 505). Scanning an area may comprise, as examples, scanning a container, a box, a storage bin, and a pallet station. A tag reader may scan, or interrogate, the area by sending activation signals and listening for a response from tags in the area, or the tag reader may listen for transmissions from active tags. The information transmitted from RFID tags in the area may be unique product identification numbers for goods to which the tags are attached. Additionally, the transmitted information may be manifest or inventory information stored in RFID tags.

After receiving a transmission signal, or broadcast from one or more tags in the area, the RFID tag reader, or an electronic processing system coupled to the reader, may detect a new tag in the area (element 510). In other words, the RFID tag reader may compare information transmitted and received from tags in the area to previously transmitted information from the area tags and detect that some of the information is new or has not been received before. Upon receiving the new information, the tag reader may request an inventory listing from another area (element 515). The other area may be located immediately adjacent to the area of element 505. The RFID tag reader may need to examine a list of tags known or expected to be in this other area because this other area may contain tags which broadcast information to the RFID tag reader. The inventory listing for the other area may be a listing of all the tag identification numbers, such as serial numbers, part numbers, and model numbers that are located in the other area. Alternatively, the inventory listing may comprise a manifest of tags or tag information that is expected to be located in the other area. For example, the manifest may be a listing of the quantity and type of items expected to be on hand for the other area.

After receiving the inventory listing for the other area, the RFID tag reader may examine it to determine if the newly detected tag is expected to be located in the other area (element 520). For example, if the newly detected tag information, such as a serial number, is detected in the inventory listing for the other area, then the newly detected tag is probably not located in the area of element 505, but rather located in the other area. If the tag information is found in the inventory listing (element 525) then the RFID tag reader may exclude the tag from the inventory listing for the area of 505 (element 530). However, if the tag is not found in the inventory listing (element 525) then the RFID may proceed to request and examine other inventory lists for even more areas (elements 535, 515, and 520). Once all the inventory listings for all the other areas have been examined (element 535) and none of the inventory listings contain the newly detected tag information (element 525), then the RFID tag reader may then add the newly detected tag to the current inventory of the initial area (element 540).

Different embodiments for improving polling accuracy of RFID systems may be configured in a variety of ways. Some RFID system embodiments may comprise RFID tags, RFID readers, an RFID central computer, and an RFID central computer software program accessing an RFID system software database. However, other embodiments may contain no software programs or software databases, relying exclusively on hardware to improve polling accuracy for RFID systems in accordance with, e.g., flowchart 500 as shown in FIG. 5. For embodiments that have software programs, the programs may define functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media to improve polling accuracy in RFID systems. It is understood that the form of the invention shown and described in the detailed description and the drawings are to be taken merely as examples. It is intended that the following claims be interpreted broadly to embrace all the variations of the example embodiments disclosed.

Although the present invention and some of its advantages have been described in detail for some embodiments, it should be understood that various changes, substitutions and alterations can be made herein without departing from the spirit and scope of the invention as defined by the appended claims. Further, embodiments may achieve multiple objectives but not every embodiment falling within the scope of the attached claims will achieve every objective. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method to improve polling accuracy in a radio frequency identification system, the method comprising:

receiving a first set of information of a first RFID tag by a tag reader, wherein the tag reader receives information from one or more tags located in a first area;

comparing the first set of information to information of a current inventory of a second area; and adding identification information of the first RFID tag to a first inventory if the comparison reveals that at least some of the first set of information is absent from the information of the current inventory of the second area.

* * * * *